United States Patent
Sekino et al.

(10) Patent No.: US 7,184,596 B2
(45) Date of Patent: Feb. 27, 2007

(54) IMAGE PROCESSING APPARATUS FOR REDUCING CODING LOAD

(75) Inventors: Masanori Sekino, Kanagawa (JP); Takashi Sakamoto, Ebina (JP); Ryoko Saitoh, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 693 days.

(21) Appl. No.: 10/376,589

(22) Filed: Mar. 3, 2003

(65) Prior Publication Data

US 2003/0231802 A1    Dec. 18, 2003

(30) Foreign Application Priority Data

Jun. 4, 2002    (JP) ............... 2002-162820

(51) Int. Cl.
*G06K 9/36* (2006.01)
*G06K 9/00* (2006.01)

(52) U.S. Cl. .................................. 382/232
(58) Field of Classification Search ............... 382/115, 382/117, 164, 167, 173, 224, 232, 238, 244, 382/274; 358/1, 9, 3.14, 501, 504, 505, 520; 375/240.15, 240.16, 240.21; 355/77
See application file for complete search history.

(56) References Cited

U.S. PATENT DOCUMENTS

| | | | | |
|---|---|---|---|---|
| 5,109,282 A | * | 4/1992 | Peli .......................... | 358/3.14 |
| 6,088,391 A | * | 7/2000 | Auld et al. ............ | 375/240.15 |
| 6,198,843 B1 | * | 3/2001 | Nakauchi et al. .......... | 382/167 |
| 6,292,514 B1 | * | 9/2001 | Yamaguchi et al. ... | 375/240.21 |
| 6,980,326 B2 | * | 12/2005 | Tsuchiya et al. ............. | 358/1.9 |
| 7,003,037 B1 | * | 2/2006 | Bordes et al. .......... | 375/240.16 |
| 2001/0028749 A1 | | 10/2001 | Kimura | |
| 2001/0052971 A1 | * | 12/2001 | Tsuchiya et al. .............. | 355/77 |
| 2003/0231802 A1 | * | 12/2003 | Sekino et al. ............... | 382/274 |

FOREIGN PATENT DOCUMENTS

| JP | A-6-350991 | 12/1994 |
|---|---|---|
| JP | B2-2888186 | 2/1999 |
| JP | A-2001-268565 | 9/2001 |

* cited by examiner

*Primary Examiner*—Amir Alavi
(74) *Attorney, Agent, or Firm*—Oliff & Berridge, PLC

(57) ABSTRACT

An image processing apparatus changes a pixel value of a pixel of interest in image data to be processed by a predetermined condition concerning a spatial frequency to generate corrected image data, and performs a predetermined coding process with regard to the corrected image data to generate coded data. Thus, processor load in the coding process can be reduced.

6 Claims, 6 Drawing Sheets

IMAGE PROCESSING APPARATUS FOR REDUCING CODING LOAD

BACKGROUND OF THE INVENTION

1. Field of the Invention

The present invention relates to an image processing apparatus such as an apparatus provided with scanner, printer, or the like, and more particularly to an improved coding process.

2. Description of Related Art

In composite apparatuses provided with a scanner, printer, or the like, in order to reduce operation load in transmission/reception or storage of image data, image data is compressed by various coding processes to reduce the data amount. Of these coding processes, JPEG (Joint Picture Experts Group) coding is widely used as an international standard for image compression technology. However, when an image is processed using JPEG, only rough quantization is provided for high frequency components. Therefore, although significant image deterioration is not observed in a natural picture such as a photograph, images having many high frequency components, such as text and line art drawings, suffer from image deterioration called mosquito noise at boundary portions of differently colored regions.

On the other hand, because image data input to various image processing apparatuses including an apparatus provided with a scanner, printer, or the like, contains both photograph portions and text portions, uniform compression for such image data using JPEG results in undesirable partial image deterioration. It has been therefore proposed to separate input image data into a photograph portion and a text portion, and each portion is subjected to appropriate compression. For example, in MRC (ITU-TT.44 Mixed Raster Content) which is an international standard, image data is divided into a foreground image and a background image, which are switched using mask image data for compression by coding, and decoding.

More specifically, portions of image data suitable for JPEG, such as a natural picture, form a background image whereas other image data portions form a foreground image, and mask image data indicating the location of the foreground portion is generated. The background image is then compressed by JPEG coding and the foreground image is compressed by another coding method (such as predictive coding). In this manner, reduction in data amount and prevention of image quality deterioration is achieved.

The conventional approaches such as MRC, however, require image data separation as described above, and therefore require more than one coding device, which complicates the system configuration and increases operation load. There is therefore a demand for an image processing apparatus capable of reducing load in a coding process with a simple configuration.

SUMMARY OF THE INVENTION

The advantage of the present invention is to provide an image processing apparatus capable of reducing load in a coding process with a simple configuration.

The present invention comprises a corrector for changing a pixel value of a pixel of interest in image data to be processed, by a predetermined condition concerning a spatial frequency to generate corrected image data, and an encoder for performing a predetermined coding process with regard to the corrected image data to generate coded data.

According to the present invention, image data is corrected within a range which does not cause visual image deterioration and the corrected image data is then coded, so that load in coding can be reduced while maintaining the coding efficiency. Further, as the need for adopting a plurality of coding methods is eliminated, the configuration of the apparatus can be simplified.

BRIEF DESCRIPTION OF THE DRAWINGS

These and other advantages of the invention will be explained in the description below, in connection with the accompanying drawings, in which.

DETAILED DESCRIPTION OF THE PREFERRED EMBODIMENT

Figure 1:
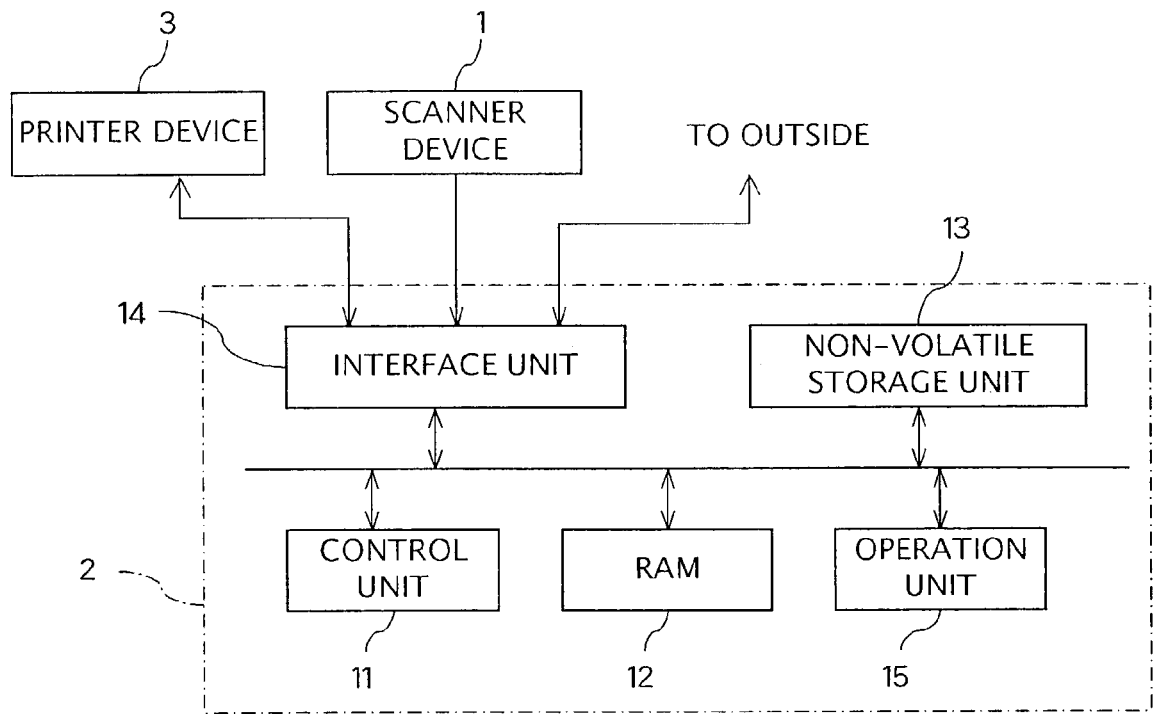
FIG. 1 is a block diagram showing a configuration of an image processing apparatus according to an embodiment of the present invention.

An embodiment of the present invention will be described with reference to the drawings. As shown in FIG. 1, an image processing apparatus according to the present embodiment, which may be an apparatus provided with scanner, printer or the like, for example, comprises a central device 2, a scanner device 1 and a printer device 3. Image data read by the scanner device 1 is coded in the central device 2 and transmitted to the printer device 3, where the coded image data is decoded for printing. The central device 2 comprises a control unit 11, a RAM (Random Access Memory) 12, a non-volatile storage unit 13, an interface unit 14, and an operation unit 15, as shown in FIG. 1. The control unit 11 can be implemented using a computer.

The control unit 11 operates in accordance with a program stored in the non-volatile storage unit 13, and implements a corrector and an encoder of the present invention. More specifically, the control unit 11 performs a correction process for changing a pixel value of at least some of pixels included in the image data input via the interface unit 14 to generate corrected image data, and a coding process for applying predetermined coding to the corrected image data to generate compressed image data. Further, the control unit 11 outputs the compressed image data externally via the interface unit 14, in response to a request from a user which is input through the operation unit 15. Each process will be described in detail below.

The RAM 12 operates as a work memory of the control unit 11, and holds the corrected image data and the compressed image data. The non-volatile storage unit 13, which is a computer readable storage medium such as a flash memory, stores an image processing program to be executed by the control unit 11. The interface unit 14 is connected to the scanner device 1 and the printer device 3 for outputting the image data received from the scanner device 1 to the control unit 11 or outputting data to the printer device 3 in accordance with an instruction from the control unit 11. Further, the interface unit 14 may be connected with a network or the like. In this case, the interface unit 14 supplies data received via the network to the control unit 11 and transmits data through the network in accordance with an instruction from the control unit 11.

The processes performed by the control unit 11 will be described. As described above, the control unit 11 basically performs correction and coding.

Correction is a process in which a pixel value of a pixel of interest in image data to be processed is changed under a predetermined condition concerning a spatial frequency to generate corrected image data, which is then stored in the RAM 12. More specifically, this correction process may be any one of (1) a process in which image data is divided into pixel groups each having a predetermined size and correction is applied for each pixel group (hereinafter referred to as first correction process); (2) a process in which image data is divided into pixel groups each having a predetermined size, a correctable range of pixel values in the pixel group is calculated, and correction is performed within that range (hereinafter referred to as second correction process); and (3) a process in which a pixel group is selected with the size of a pixel group to be selected being increased, to define the maximum size which allows correction, and correction is performed on the pixel group having the maximum size (hereinafter referred to as third correction process).

Figure 2:
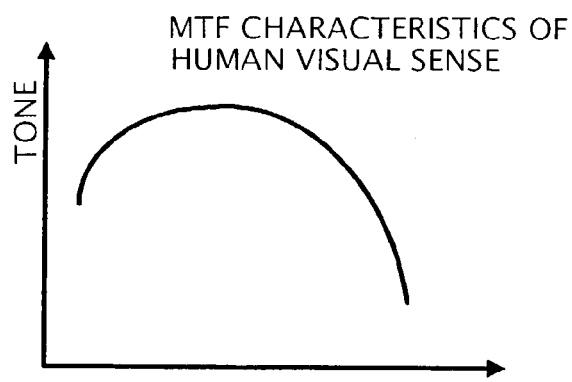
FIG. 2 is an explanatory view showing the outline of the MTF characteristics curve.

The principle for reducing image deterioration caused by correction of pixel value to an allowable range when observed by the human eye will be briefly described. With human visual perception, the limit of contrast sensitivity with regard to the spatial frequency (a degree of pixel value change within a certain region of image data) varies as shown in FIG. 2. FIG. 2 shows a change curve measured experimentally, which is generally called a MTF (Modulation Transfer Function) characteristic curve. According to the MTF characteristic curve, it can be understood that as the spatial frequency increases, the limit of the contrast sensitivity decreases, making an image appear to have only one color. Consequently, for an image region having a certain degree of high spatial frequency, image deterioration cannot be observed by the human eye even when pixel values contained in that image region are set to a single color. Accordingly, by setting the pixels in that region to a single color and then subjecting the pixels to predictive coding, it is possible to increase the efficiency of the predictive coding, so that general image data including natural picture portions can be processed sufficiently only with the predictive coding.

Figure 3:
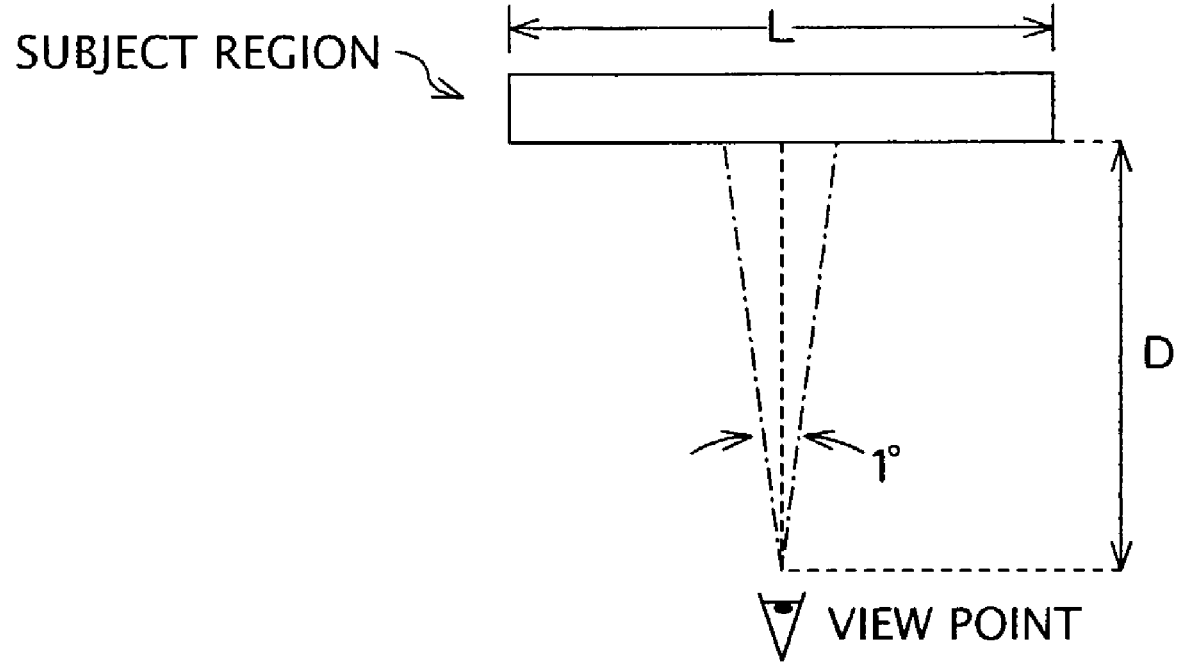
FIG. 3 is an explanatory view showing the outline concerning the calculation of spatial frequency.

As shown in FIG. 3, because the spatial frequency can be defined as an amount of change in pixel value (wave number of pixel value) per unit visual angle (1 degree, for example), the spatial frequency concerning a line of pixels extending in the column direction, for example, can be defined by the length (region length) L of that pixel line and the distance (visual range) D between the image and the eye (observer).

In the present embodiment, it is considered that image deterioration is most noticeable when a line of pixels having a region length L are all painted with the same value (in a single color). Then, it is assumed that a wave having two times a region length (2L), which is the maximum period which can be obtained by the short-time Fourier transform in that region, is a wave number in that region. Namely, it is assumed that the spatial frequency of this region is 1/(2L). Because the length of the unit visual angle is expressed using the visual range D (which is previously determined in accordance with the intended use of an image which is ultimately output), as

[Expression 1]

$$D \cdot \tan(1°) \qquad (1)$$

the spatial frequency f of the target region can be calculated as follows:

[Expression 2]

$$f = D \cdot \tan(1°) \cdot \frac{1}{2L} \qquad (2)$$

Note that the above expression is an example method for calculating the spatial frequency, and other methods can also be adopted.

Then, the limit of contrast sensitivity for human vision (hereinafter referred to as limit contrast) with regard to the spatial frequency f thus obtained is found with reference to the MTF characteristics curve. For example, sampling data (which corresponds to the MTF characteristic curve information of the present invention) in which a plurality of spatial frequency values are associated with the corresponding limit_contrast values is previously stored, and the limit contrast value associated with the spatial frequency which is the most approximate to the obtained spatial frequency f is selected, from the sampling data, as the limit contrast for the obtained spatial frequency. Alternatively, the limit contrast corresponding to the obtained spatial frequency is determined by interpolating each sampling data.

The limit contrast corresponds to a tone required for viewing a target region as an image without visual deterioration. Therefore, the amplitude of pixel values (a difference between the minimum pixel value and the maximum pixel value) in the target region is divided by the limit contrast to obtain a pixel value change tolerance, which is then used in each correction process.

Figure 4:
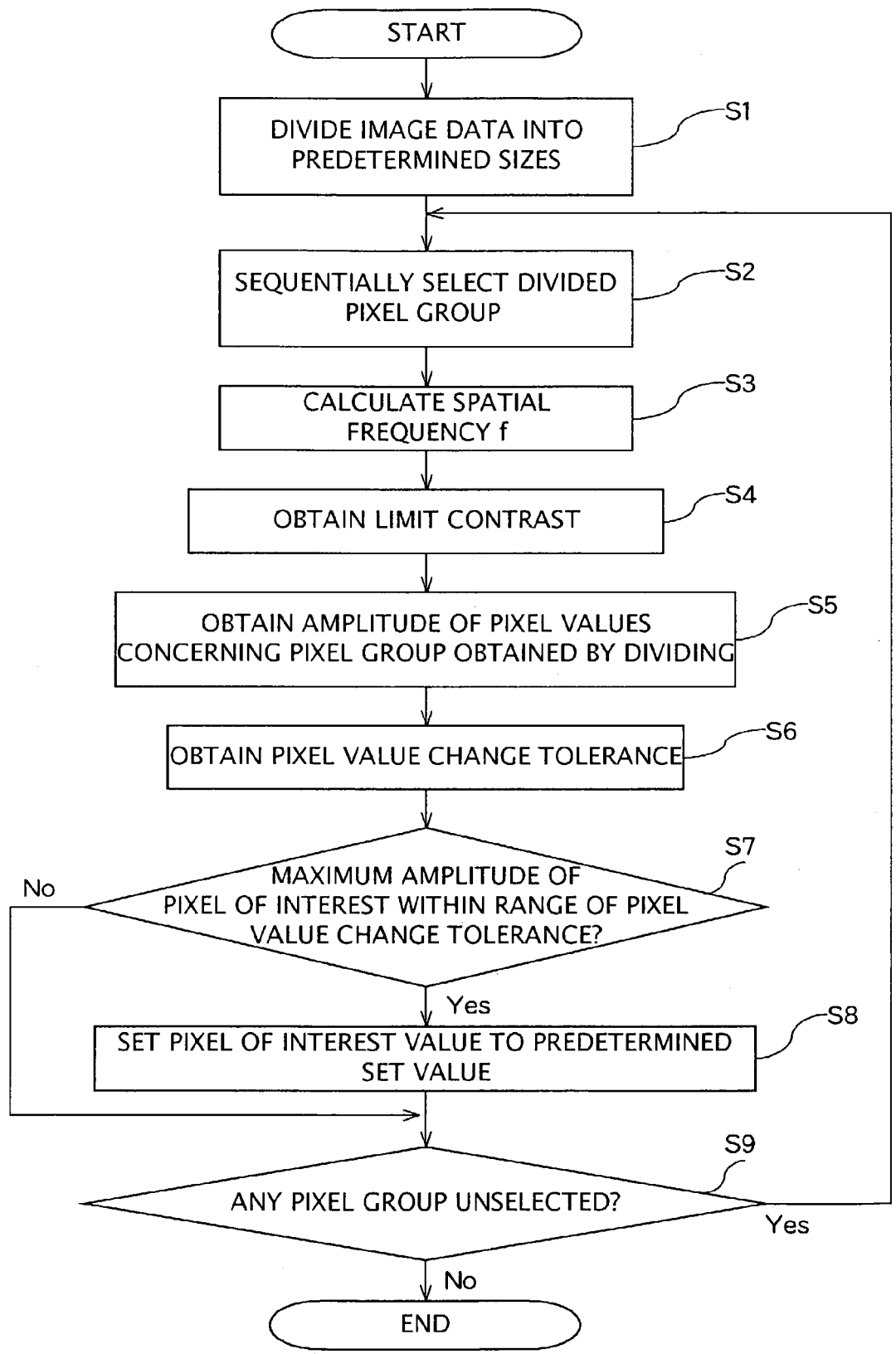
FIG. 4 is a flow chart showing an example correction process.

The first to third correction processes will be described. First, when the first correction process is carried out, as shown in FIG. 4, the control unit 11 divides image data, which is a subject of processing, into pixel groups each having a predetermined size (S1), sequentially selects each pixel group obtained in step S1 (S2), and calculates the spatial frequency f for the selected pixel group (S3). The limit contrast corresponding to the spatial frequency is then obtained with reference to the MTF characteristics curve (S4). On the other hand, with reference to a value of each pixel (referred to as a pixel of interest) included in the selected pixel group, the amplitude of the pixel of interest is obtained (S5). Based on the limit contrast obtained in step S4 and the amplitude obtained in step S5, the pixel value change tolerance is calculated (S6).

The control section 11 then examines whether or not the value of each pixel of interest falls within the pixel value change tolerance (S7). When all the pixel values of pixels of interest (the maximum amplitude) fall within the pixel value change tolerance (Yes), the value of the pixel of interest is set to a predetermined set value (S8). The predetermined set value may be a representative pixel value which is one of the pixel values of pixels of interest, or may be a statistical value (median, intermediate value, average value, and so on) which can be obtained from the value of each pixel of interest.

When all the pixel values of pixels of interest fall within the pixel value change tolerance as described above, namely when a ratio between two arbitrary pixel values of pixels of interest falls within a range of the limit contrast, a state in which the pixels of interest included in the selected pixel group are all painted with a single color is obtained.

The control unit 11 then examines if there is a pixel group which has not been selected (S9). When there is any pixel group which has not been selected (Yes), the process returns to step S2, where any one of these unselected pixel groups is selected for further processing. When there is no unselected pixel group in step S9 (i.e. all the pixel groups have been processed), the first correction process is completed, and the corrected image data including the processed pixel groups is stored in the RAM 12.

On the other hand, if the value of any pixel of interest does not fall within the pixel value change tolerance (No) at step S7, the process proceeds to step S9 for further processing.

As described above, according to the first correction process, when the ratio between the pixel values of pixels of interest falls within the limit contrast which has been obtained, the value of each pixel of interest is changed to a corrected pixel value which is determined in relation to at least one of the pixel values of pixels of interest.

Figure 5:
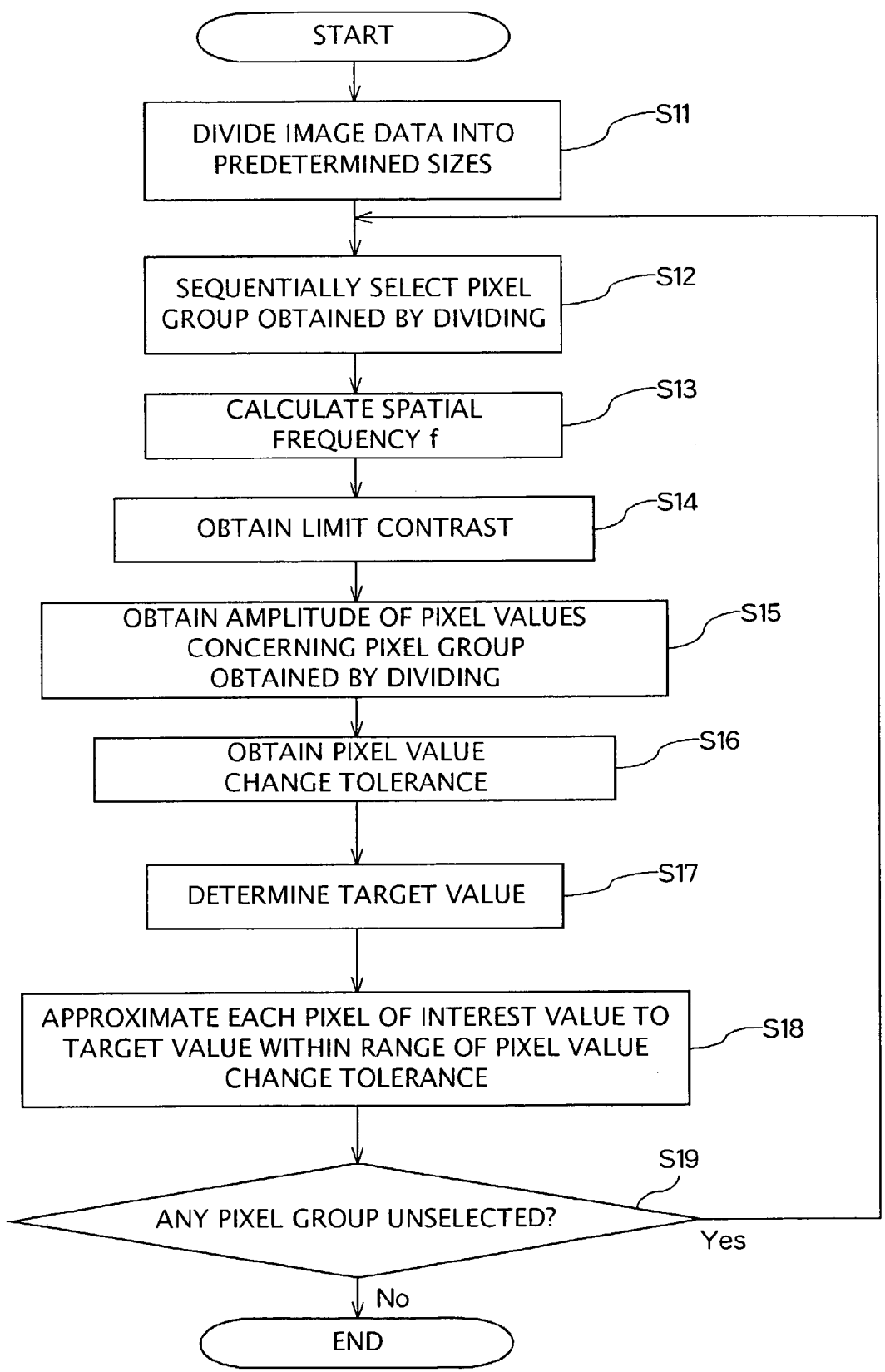
FIG. 5 is a flow chart showing another example correction process.

Next, the second correction process will be described. In the second correction process, as shown in FIG. 5, the control unit 11 divides image data which is a subject of processing into pixel groups each having a predetermined size (S11), sequentially selects each pixel group obtained in step S11 (S12), and calculates the spatial frequency f for the selected pixel group (S13). The limit contrast corresponding to the spatial frequency is then obtained with reference to the MTF characteristic curve (S14). On the other hand, with reference to value of each pixel of interest included in the selected pixel group, the amplitude of each pixel of interest is obtained (S15). Based on the limit contrast obtained in step S14 and the amplitude obtained in step S15, the pixel value change tolerance is calculated (S16).

The control section 11 then determines a target value with reference to at least one of the pixel values of pixels of interest (S17). The target value may be one of the pixel values of pixels of interest, for example, or may be a statistical value (median, intermediate value, average value, and so on) which can be obtained from the value of each pixel of interest.

The control unit 11 then corrects each pixel value so as to approximate to the target value using the pixel value change tolerance as a limit (S18). Specifically, assuming that the original pixel value to be corrected is P, the target value is T, and the pixel value change tolerance is Δ, the corrected pixel value P' is expressed as follows:

[Expression 3]

when $|P-T| > \Delta$, $$P' = P + \frac{P-T}{|P-T|} \cdot \Delta$$

in other cases, $$P' = P - T$$

Accordingly, when all the pixel values of pixels of interest fall within the pixel value change tolerance, namely if a ratio between two arbitrary pixel values of pixels of interest falls within a range of the limit contrast, the pixels of interest included in the selected pixel group are all painted by a single color corresponding to the target value, whereas if not, the pixel of interest is corrected to a color corresponding to a value which is approximate to the target value.

Next, the control unit 11 examines whether or not there is a pixel group which has not been selected (S19). When there is a pixel group which has not been selected (Yes), the process returns to step S12 where any one of the unselected pixel groups is selected for further processing. When there is no unselected pixel group in step S19 (i.e. all the pixel groups have been processed), the second correction process is completed, and the corrected image data containing the processed pixel groups is stored in the RAM 12.

According to the second correction process, the value of a pixel of interest is approximated, as much as possible, to a target value in a region formed by the corresponding pixel group, within a range of the pixel value change tolerance.

The third correction process will be described. In the third correction process, the control unit 11 defines a region having a variable length in which pixel values can be corrected without causing image deterioration, while scanning a pixel on the image data to be processed according to a predetermined sequence (from the upper row to the lower row, and from left to right within a row, for example), and corrects the pixel of interest in the pixel group within the defined region to a predetermined pixel value.

Figure 6:
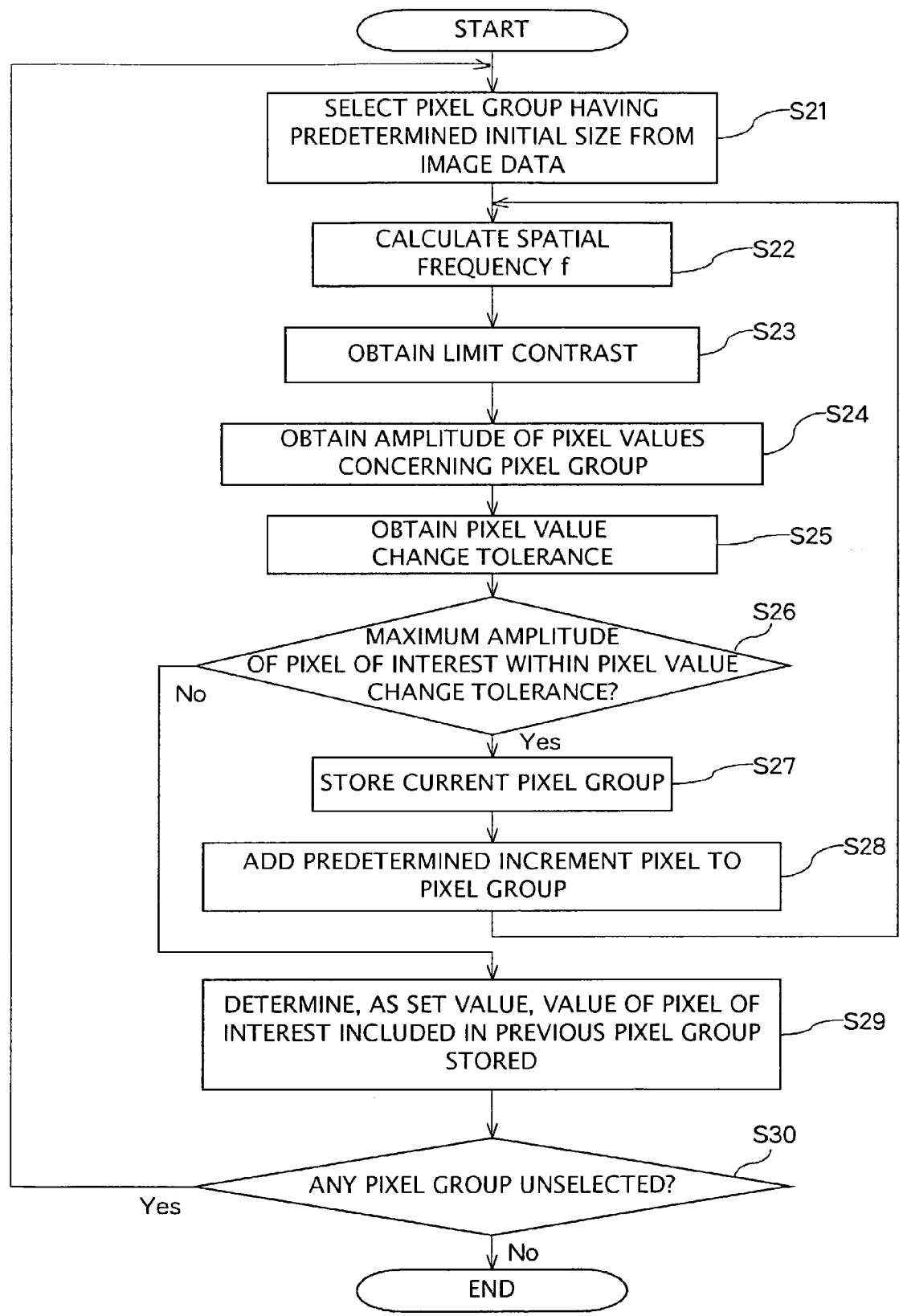
FIG. 6 is a flow chart showing a still another example correction process.

More specifically, as shown in FIG. 6, the control unit 11 selects a pixel group having a predetermined initial size while scanning a pixel on the image data which has not been a subject for correction (S21), and then calculates a spatial frequency f for the selected pixel group (S22). Further, the limit contrast corresponding to the spatial frequency is obtained with reference to the MTF characteristic curve (S23). On the other hand, the control unit 11 obtains the amplitude of the pixels of interest with reference to the value of each pixel of interest included in the selected pixel group (S24), and then calculates the pixel value change tolerance from the limit contrast obtained in step S23 and the amplitude obtained in step S24 (S25).

The control unit 11 then examines whether or not the value of each pixel of interest falls within the range of the pixel value change tolerance (S26). When all the pixel values of pixels of interest are in the range of the pixel value change tolerance (namely, when the maximum amplitude falls in the pixel value change tolerance: Yes), the present pixel group is assumed as a temporarily defined region and stored in the RAM (S27). Then, while scanning a pixel in the image data which has not been selected in the predetermined sequence, only the pixel corresponding to a predetermined increment amount (one pixel, for example) is added to the present pixel group to generate a new pixel group (S28). The process then returns to step S22 for further processing. Note that in step S27, the information regarding the region which was previously stored may be rewritten.

When the value of any pixel of interest does not fall within the range of the pixel value change tolerance (No) in step S26, the pixel group in the region which was temporarily defined previously is established as the pixel group of the defined region, and the values of pixels of interest included in that defined region are set to a predetermined set value (S29). The predetermined set value may be a representative pixel value which is one of the pixel values of pixels of interest, or may be a statistical value (median, intermediate value, average value, and so on) which can be obtained from a value of each pixel of interest. At this time, because a pixel which is not included in the region temporarily defined previously, but is selected at step S28, is not a subject of correction, such a pixel becomes a candidate for selection when the next pixel group is selected at step S21.

The control unit 11 examines whether or not there is a pixel in the image data which has not been a subject for correction (S30). If there is such a pixel (Yes), the process returns to step S21 for further processing. Further, when the correction process with regard to the image data is completed (No) at step S30, the third correction process is terminated, and the corrected image data including the processed pixel groups is stored in the RAM 12.

In this manner, the input image data is divided into sections each having the maximum region length in which a value of each pixel of interest falls within the pixel value change tolerance. Namely, the length of each region thus divided varies at different locations, and is not uniform in the image data.

The control unit 11 then performs a predetermined coding process with regard to the corrected image data which is generated by any of the first to third correction processes and generates coded data. Here, the coding process can be, for example, the process disclosed in Japanese patent No. 2888186 entitled "Image coder and image decoder", which is a type of predictive coding or reversible coding.

In the image processing apparatus according to the present embodiment, with regard to each pixel of the image data input from the scanner device 1, the central device 2 corrects and changes the pixel value in relation to the spatial frequency and based on the predetermined condition concerning the possibility of identifying deterioration by the human eye, and generates corrected image data. The central device 2 then performs predetermined coding with regard to the corrected image data for generating coded data, which is then output, in response to an instruction, to the printer device 3 for printing, or is transmitted to an external device via a network or the like.

According to the present embodiment, it is possible to reduce the code amount within a range which does not cause visual image deterioration even when using predictive coding, which is not typically appropriate for a natural picture. Further, it is also possible to eliminate the need for adopting a plurality of coding methods, thereby simplifying the configuration of the apparatus.

When decoding the coded data, a decoding process corresponding to the coding process is performed. The image obtained by decoding is the corrected image data.

While a case in which the pixel value is expressed by a tone difference, namely gray scale, has been mainly described in the above example, when a color image is to be processed, it is possible to decompose the color image into regions having each primary color and perform the processing similar to that described above using a tone difference for each primary color. In this case, it is preferable to define a range which does not cause visual image deterioration when observed by the human eye, in accordance with color characteristics, namely using the MTF characteristics curve for each primary color, in addition to the spatial frequency.

Further, it is possible to generate a corrected pixel value in the above correction process, with regard to the coding process performed by the control unit 11. For example, in predictive coding, a value which is predicted during the process of the predictive coding (predicted value) is used as a set value or a target value in the correction process. More specifically, when a coding process is performed through a plurality of stages, a pixel value is corrected based on the result of the coding process in the previous stage for generating corrected image data, which is then applied to the coding process in the following stage. With this configuration, because correction is performed integrally with coding, a correction process suitable to coding can be performed. Further, because a set value or a target value for the correction process is generated in the process of coding, process efficiency can be improved.

Figure 7:
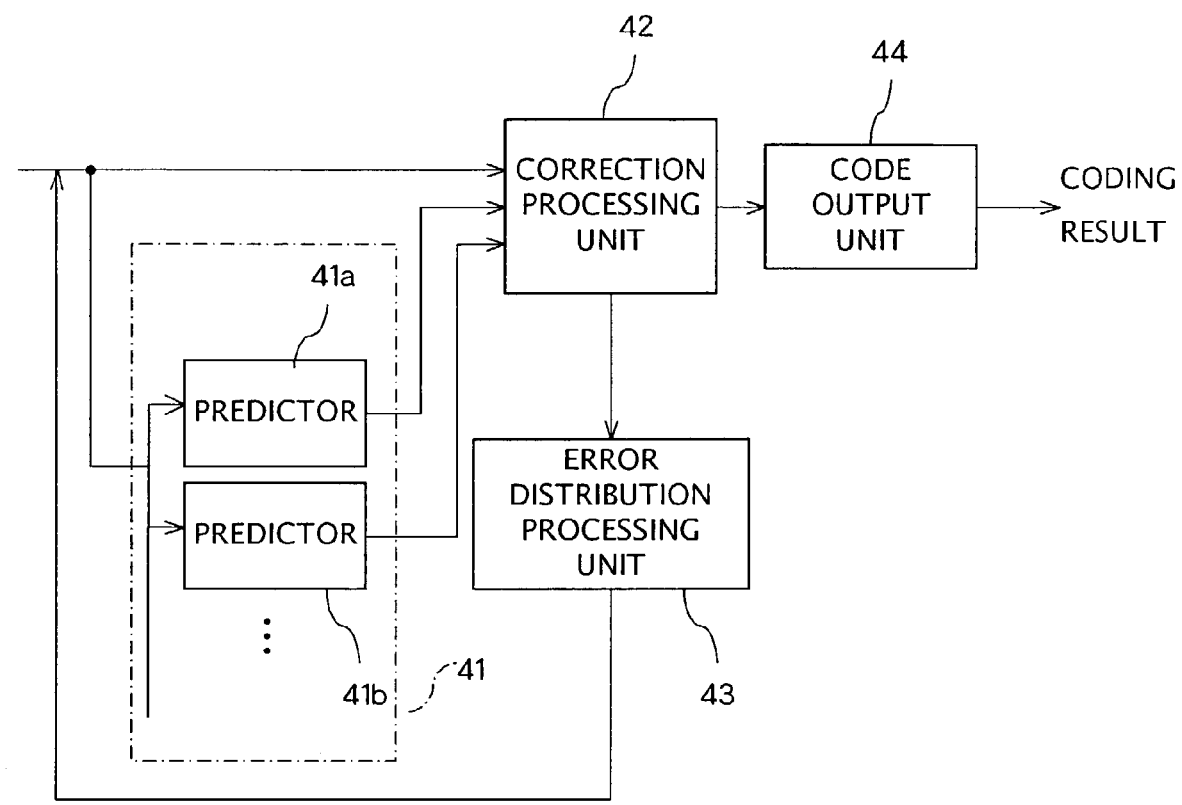
FIG. 7 is a functional block diagram showing an example program to be executed by the control unit 11.

More specifically, the functional block of a program to be executed by the control unit 11 for predictive coding comprises, as shown in FIG. 7, a prediction unit 41 including a plurality of predictors 41a, 41b, ..., a correction processing unit 42, an error distribution processing unit 43, and a code output unit 44. The prediction section 41 comprises a plurality of predictors 41a, 41b, ... which perform different pixel prediction. Specifically, each predictor selects, as a pixel of interest, one pixel of the input image data, and outputs a predictive value which is a pixel value of the pixel of interest predicted by a prediction method which differs among the predictors.

The correction processing unit 42 performs the third correction process, for example. Namely, the control unit 11 which carries out a process of the correction processing unit 42 sequentially selects a pixel to be corrected, according to the predetermined sequence starting from the pixel of interest selected by the prediction unit 41, and proceeds to the subsequent process while incrementing the number of the selected pixel.

More specifically, the control unit 11 calculates the spatial frequency f with regard to the selected pixel group to be corrected, obtains the limit contrast from the spatial frequency f with reference to the MTF characteristics curve, and then obtains the amplitude of the pixel value in the pixel group to be corrected with reference to the value of each selected pixel to be corrected. Then, based on the limit contrast and the amplitude, the control unit 11 calculates the pixel value change tolerance. Next, each predicted value and each pixel to be corrected are compared. As a result of the comparison, when a difference between any predicted value and each pixel value of all the pixels to be corrected falls within the pixel value change tolerance, the number of selected pixels is incremented again.

Then, the pixel group to be corrected having the maximum size, in which a difference between any predicted value and each pixel value of all the pixels to be corrected falls within the pixel value change tolerance, is defined, and the pixel values to be corrected in the defined pixel group are set to a set value, which is a predicted value whose difference from each pixel value of all the pixels to be corrected falls within the pixel value change tolerance. At this time, when a plurality of predicted values satisfy the above condition, a condition regarding which predicted value should be selected is previously defined. For example, a predicted value having the least square sum of a difference between the predicted value and each value of the pixel to be corrected, may be selected.

Further, for the process performed by the correction processing unit 42, the control unit 11 outputs, as error information, a difference between the set value and the value of each original pixel to be corrected to the error distribution processing unit 43. The correction processing unit 42 then returns to a process for selecting the next pixel group for further processing.

In response to the input error information, the error distribution processing unit 42 distributes the error to the pixels around the current pixel of interest (or the pixel group to be corrected) for correcting the pixel value. Such an error distribution process, which is widely known, will not be described in detail.

The code output unit 44 encodes information concerning which predicted value is selected and the size of the pixel group to be corrected, and outputs the result as a predicted code result. Namely, when decoding this information, the corrected image data is reproduced in such a manner that the location of a pixel to be reproduced is selected in the same sequence as the selection sequence in the prediction unit 41, and decoding is performed while specifying the predicted value of the pixel at the selected location and the size of the pixel group which is painted with the predicted value.

With the correction process and the coding process as described above, rather than a tradeoff between image deterioration and code amount as conventionally presented, image coding without visual variation can be realized.

While the preferred embodiment of the present invention has been described using specific terms, such description is for illustrative purposes only, and it is to be understood that changes and variations may be made without departing from the spirit or scope of the appended claims.

What is claimed is:

1. An image processing apparatus comprising:
    a corrector for changing a pixel value of a pixel of interest in image data to be processed, by a predetermined condition concerning a spatial frequency to generate corrected image data; and
    an encoder for performing a predetermined coding process with regard to the corrected image data to generate coded data.

2. An image processing apparatus according to claim 1, wherein the corrector holds, for each spatial frequency, MTF characteristic curve information which defines a limit of contrast sensitivity for human vision, and generates the corrected image data by:
    dividing the image data to be processed into pixel groups, each pixel group having a predetermined size;
    when each pixel included in a pixel group obtained by dividing the image data is assumed as a pixel of interest, calculating a spatial frequency in relation to the pixel value of each pixel of interest, a predetermined visual range, and a size of the pixel group,
    obtaining, as limit contrast, the limit of contrast sensitivity for human vision at the spatial frequency which is calculated, with reference to the MTF characteristics curve information; and
    when a ratio between pixel values of the pixels of interest falls within the limit contrast which is obtained, changing the pixel value of each pixel of interest to a corrected pixel value which is defined in relation to at least one pixel value of the pixels of interest.

3. An image processing apparatus according to claim 1, wherein the corrector holds, for each spatial frequency, MTF characteristics curve information which defines a limit of contrast sensitivity for human vision and generates the corrected image data by:
    dividing the image data to be processed into pixel groups, each pixel group having a predetermined size;
    when each pixel included in a pixel group obtained by dividing the image data is assumed as a pixel of interest, calculating a spatial frequency in relation to the pixel value of each pixel of interest, a predetermined visual range, and a size of the pixel group,
    obtaining, as limit contrast, the limit of contrast sensitivity for human vision at the spatial frequency which is calculated, with reference to the MTF characteristics curve information;
    calculating a target pixel value for the pixels of interest in relation to at least one pixel value of the pixels of interest; and
    changing the pixel value of each pixel of interest so as to approximate the target pixel value within a range of the limit contrast which is obtained.

4. An image processing apparatus according to claim 1, wherein the corrector holds, for each spatial frequency, MTF characteristic curve information which defines a limit of contrast sensitivity for human vision and generates the corrected image data by:
    a) dividing the image data to be processed into pixel groups, each pixel group having a predetermined initial size;
    b) when each pixel included in a pixel group obtained by dividing the image data is assumed as a pixel of interest, calculating a spatial frequency defined in relation to the pixel value of each pixel of interest, a predetermined visual range, and the size of the pixel group,
    c) obtaining, as limit contrast, the limit of contrast sensitivity for human vision at the spatial frequency which is calculated, with reference to the MTF characteristics curve information;
    d) when a ratio between pixel values of the pixels of interest falls within the limit contrast which is obtained, increasing the size of the pixel group by a predetermined increment amount; and
    e) while repeating the above steps b) to d), defining the pixel group having the maximum size in which a difference of pixel values between the pixels of interest falls within a range of the limit contrast which is obtained, and changing the pixel value of each pixel of interest included in the pixel group which is defined to a corrected pixel value defined in relation to at least one pixel value of the pixels of interest included in the pixel group which is defined.

5. A method of generating coded data, comprising the steps of:
    changing a pixel value of a pixel of interest in image data to be processed by a predetermined condition concerning a spatial frequency to generate corrected image data; and
    performing a predetermined coding process with regard to the corrected image data to generate coded data.

6. A computer readable storage medium storing a set of program instructions executable on a data processing device and usable to generate coded data, the instructions comprising:
    instructions for changing a pixel value of a pixel of interest in image data to be processed by a predetermined condition concerning a spatial frequency to generate corrected image data; and
    instructions for performing a predetermined coding process with regard to the corrected image data to generate coded data.

* * * * *